W. DALTON.
STEAM ENGINE VALVE REVERSING GEAR.
APPLICATION FILED AUG. 21, 1913.
1,078,774.  Patented Nov. 18, 1913.
4 SHEETS—SHEET 3.
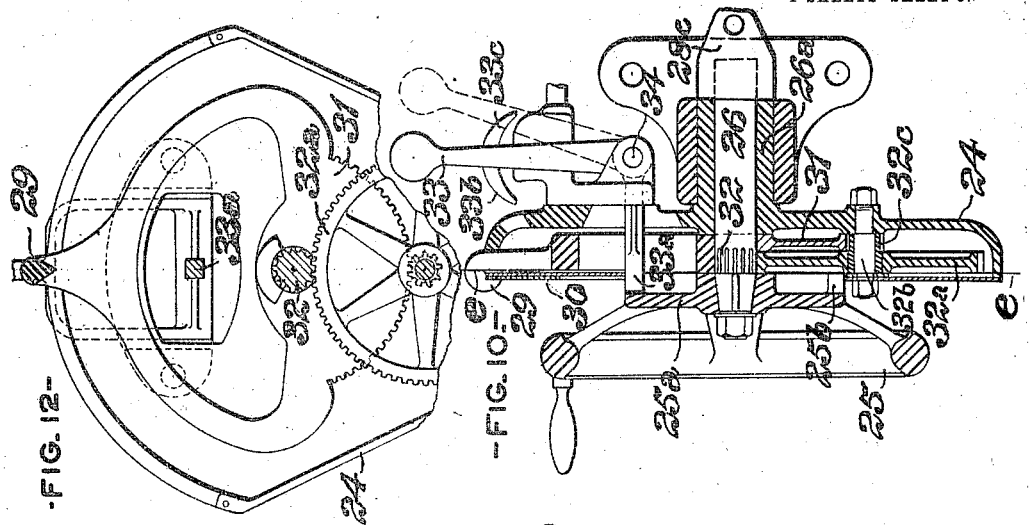
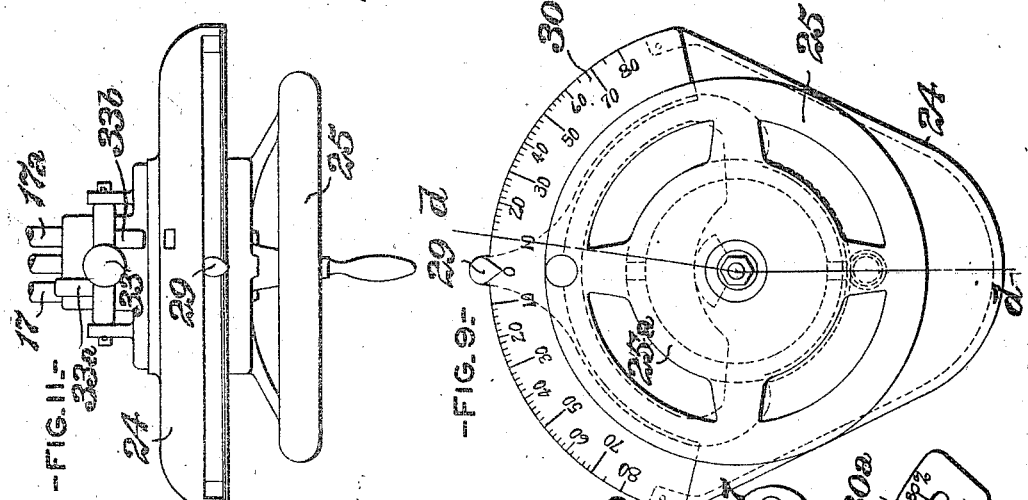
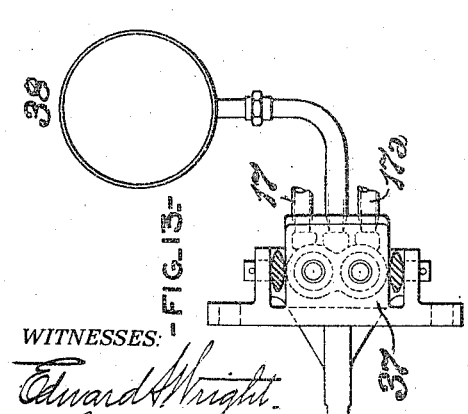
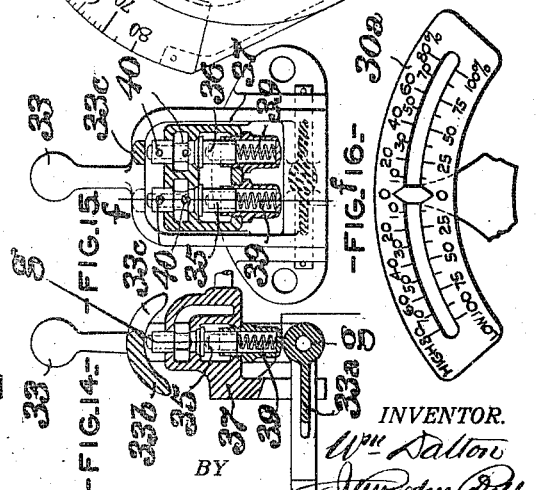
WITNESSES:
Edward A. Wright
S. R. Bell
INVENTOR.
Wm Dalton
BY Howden Bell
ATTORNEY.

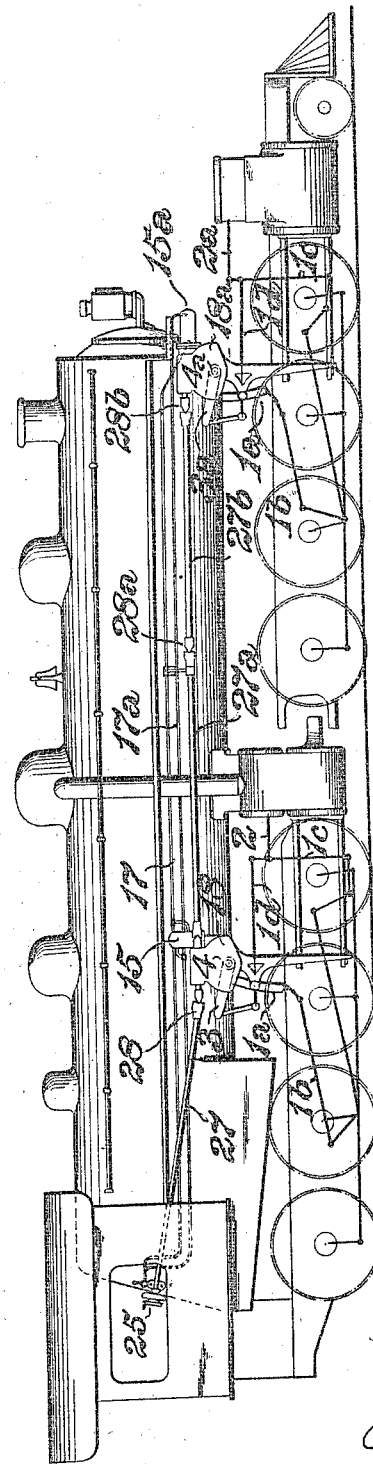

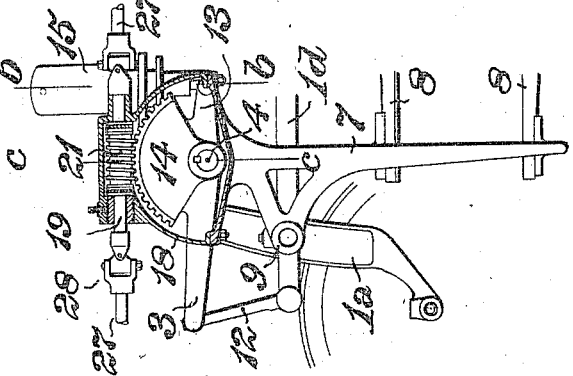
W. DALTON.
STEAM ENGINE VALVE REVERSING GEAR.
APPLICATION FILED AUG. 21, 1913.
1,078,774.
Patented Nov. 18, 1913.
4 SHEETS—SHEET 2.

W. DALTON.
STEAM ENGINE VALVE REVERSING GEAR.
APPLICATION FILED AUG. 21, 1913.
1,078,774.
Patented Nov. 18, 1913.
4 SHEETS—SHEET 4.
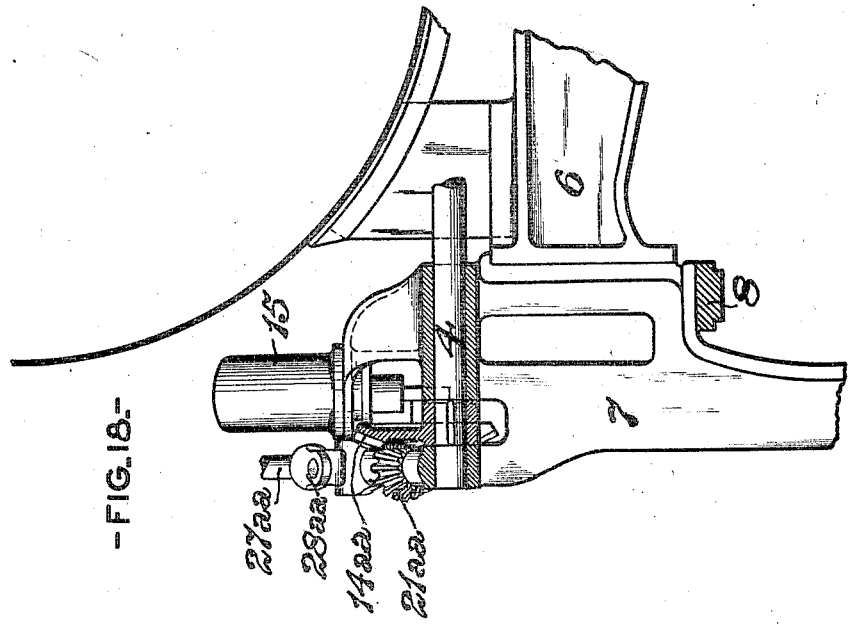
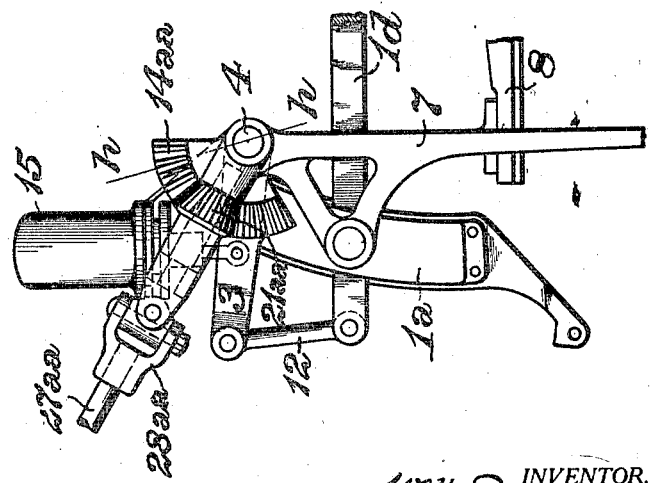

UNITED STATES PATENT OFFICE.

WILLIAM DALTON, OF SCHENECTADY, NEW YORK.

STEAM-ENGINE VALVE-REVERSING GEAR.

1,078,774.     Specification of Letters Patent.     Patented Nov. 18, 1913.

Application filed August 21, 1913. Serial No. 785,875.

*To all whom it may concern:*

Be it known that I, WILLIAM DALTON, of Schenectady, in the county of Schenectady and State of New York, have invented a certain new and useful Improvement in Steam-Engine Valve-Reversing Gear, of which improvement the following is a specification.

My invention relates to power actuated reversing gear for steam engine valve mechanisms, more particularly those of locomotives, and, generally stated, its primary object is to provide means whereby absolute control by the operator, and the highest degree of precision when adjusting the steam distributing mechanism of a locomotive or other engine, may be attained and insured.

Another object of the invention is to provide means whereby the steam distribution mechanism may be securely locked in a precise and predetermined indicated position.

A further object is to prevent possible loss of control in the event of accidental derangement, by the use of a constantly available means for manually operating and adjusting the steam distributing valve mechanism.

The improvement claimed is hereinafter fully set forth.

In the operation of large locomotives at high speed, and at their maximum power, it is essential to safety that the operator shall know with certainty, that however slight an adjustment he may make of a conveniently located controlling mechanism, an instantaneous and positive corresponding change will be effected in the steam distribution valve mechanism of the locomotive, and that this adjustment will be rigidly fixed, and not affected, in any degree, by expansion, contraction, or by the yielding of supporting parts subjected to severe stresses during the operation of the locomotive. The certainty referred to is attained in the operation of my invention.

In the accompanying drawings: Figure 1 is a diagrammatic side view of an articulated compound locomotive, illustrating an application of my invention; Fig. 2, a side view, partly in elevation and partly in section on the line *a a* of Figs. 3 and 5, of the worm and worm gear mechanism, and its connection to a Walschaert valve gear; Fig. 3, a front view of the same, partly in section, on the line *b b* of Fig. 2; Fig. 4, a side view, in elevation, showing the power motor cylinder located horizontally, in order to clear the running board of an articulated locomotive when applied to the forward engines thereof; Fig. 5, an end view, in elevation, of the construction of Fig. 4; Fig. 6, a vertical transverse section, on the line *c c* of Fig. 2; Fig. 7, a longitudinal section, on an enlarged scale, through the worm gear shown in Figs. 2 and 6; Fig. 8, a longitudinal central section through a horizontal motor cylinder, with the related movable members shown in elevation; Fig. 9, a view, in elevation, of the manually operated controlling and indicating mechanism; Fig. 10, a vertical transverse section through the same, on the line *d d* of Fig. 9; Fig. 11, a plan or top view of the same; Fig. 12, a section, on the line *e e* of Fig. 10; Fig. 13, a plan view of a fluid pressure governing valve casing; Fig. 14, a vertical section through the same, on the line *f f* of Fig. 15; Fig. 15, a view of the same, partly in elevation and partly in section on the line *g g* of Fig. 14; Fig. 16, a view, in elevation, of a duplex dial for indicating the different percentages of cut off in the high and low pressure engines of a compound engine; Fig. 17, a side view, illustrating another form of gearing; and, Fig. 18, a front view, partly in section, on the line *h h* of Fig. 17.

Referring to the drawings, my invention, which is applicable in connection with any of the various known types of distribution valve mechanism, is diagrammatically illustrated in Fig. 1, as applied for the control of the Walschaert valve gears of an articulated compound locomotive, each of which comprises a link, $1^a$, eccentric rod, $1^b$, combination lever, $1^c$, and radius bar, $1^d$, and is coupled to one of the distribution valve stems, 2, of the rear engines, or one of the distribution valve stems, $2^a$, of the forward engines, as the case may be. The radius bars are coupled to arms, 3 or $3^a$, of reverse shafts, 4 or $4^a$, (the former for the rear engines and the latter for the forward engines), and are raised and lowered throughout their range of traverse on the links, $1^a$, by my improved reversing mechanism, which is connected with, and operates on, the reverse shafts, as hereinafter described.

In the practice of my invention, the reverse shaft, or each of the reverse shafts, when the distribution valve mechanisms of more than one pair of engines are to be controlled, as in the application to an articulated compound locomotive herein exemplified, is vibrated in its bearings by the piston of a fluid pressure cylinder, to raise or lower, as the conditions of operation may, from time to time require, the connected valve gear members controlled by said reverse shaft. The supply and exhaust of motive fluid to and from the motor cylinder or cylinders is controlled by manually operable mechanism located within convenient reach of the engineman, and the reversing gear is locked in adjusted position by said controlling mechanism.

The structural and operative features of a preferred form of valve reversing mechanism embodying my invention will now be described. The side frame members, 5, of the locomotive, are connected, at proper locations in their length, by cross ties, 6, 6ª, to the outer ends of which are bolted guide yokes, 7, 7ª, which support the cross head guide bars, 8, 8ª, and are provided with lateral bearings, 9, 9ª, in which the links, 1ª, of the valve gears are journaled. The reverse shafts, 4, 4ª, are mounted in bearings, 10, 10ª, in the guide yokes, and are, respectively, provided, in the usual manner, with lifting arms, 3, 3ª, which are coupled by links, 12, 12ª, to the radius bars, 1ᵈ, of the valve gears. They are also provided, respectively, with arms, 13, 13ª, for connection to the pistons of motor cylinders. Segmental worm gears, 14, 14ª, are, respectively, secured on the reverse shafts, 3 and 3ª. A fluid pressure motor cylinder, 15, is supported on, and secured to, the rear guide yoke, 7, and a similar cylinder, 15ª, is correspondingly attached to the front guide yoke, 7ª. Each of the motor cylinders is fitted with a properly packed piston, 16, which is secured upon a piston rod, 16ª, and the outer ends of said piston rods are pivotally coupled to the arms, 13, 13ª, of the rear and front reverse shafts respectively. By the movements of the pistons in the appropriate directions, the radius bars, 1ᵈ, are, through their connections with the reverse shafts, raised or lowered to effect the desired adjustments of the valve gears, in conformity with the proper adjustment of the controlling mechanism hereinafter described. The controlled supply and exhaust of motive fluid to and from the motor cylinders is effected through conduits, 17, 17ª, leading, from a suitable source of supply, as a reservoir of air under pressure, 28, into opposite ends of the cylinders. As shown in the drawings, the motor cylinder of the rear reverse shaft is located vertically, and that of the forward reverse shaft is located horizontally, to clear the running board and step of the locomotive when the forward truck swings to either side in passing curves. It will be obvious that the angular relation of the reverse shaft arms, 3 and 13, and 3ª and 13ª, will be correspondingly different on the rear and front reverse shafts, respectively.

The direction and extent of the movements of the reverse shafts, in either direction, and the maintenance of the reversing gear in any and all adjusted positions, are effected by controlling and locking mechanism which will now be described. Casings, 18, 18ª, are formed integral with the upper sections of the bearings of the reverse shafts, 10 and 10ª, respectively, and worm shafts, 19, 19ª, extending transversely to the reverse shafts, are journaled in bearings in the respective casings. Each of said worm shafts is mounted in a fixed bearing, 20, and an opposite end bearing, 20ª, which is longitudinally adjustable by being provided with an external screw thread which engages a corresponding internal thread in the casing. The bearings, 20ª, are held in adjusted positions by set screws, 20ᵇ. Worms, 21, 21ª, each of which is made in two longitudinally separated sections, and which, respectively, engage the teeth of the segmental worm gears, 14, 14ª, are fitted on the worm shafts, and are rotated therewith by splined keys, 22. The threads of the worms, 21, 21ª, are of respectively opposite leads, that is to say, one is right handed and the other left, in order that the valve gear members of the front and rear engines may be moved in opposite directions respectively, in making adjustments of them, so that the weights of the movable valve gear members of the respective engines may be counterbalanced. Ball thrust bearings, 23, are interposed between the outer ends of the worms, 21, 21ª, and the adjacent bearings, 20, 20ª. The object of this adjustment of the worm shaft bearings is to take up wear and prevent any possible lost motion, in order to enable the reversing gear to be held in the precise position determined by a manually operated controlling mechanism, which is illustrated, in detail, in Figs. 9 to 16 inclusive, and which is of the following construction.

A casing, 24, is supported in any convenient position in the cab of the locomotive, within the reach of the engineman, and a pilot wheel, 25, is fixed upon a shaft, 26, which is journaled in a bearing, 26ª, projecting from the front of the casing, and is connected by a control shaft, 27, to a universal coupling, 28, which is, in turn, connected to the worm shaft, 19, of the rear reversing gear mechanism. The forward end of said worm shaft is connected by extension sections, 27ª, 27ᵇ, to the rear end of the worm shaft, 19ª, of the forward reversing gear mechanism, universal coupling, 28ª, 28ᵇ, being interposed between the two extension sections, and between the forward section and the forward worm shaft, to permit the lateral motion of the forward truck, and the valve gears thereon, in passing curves, without distorting or springing the sections of the control shaft.

The reverse shafts, 4, 4ª, will be locked and held in any and all adjusted positions, by the engagement of the worms, 21, 21ª, with the segmental worm gears, 14, 14ª, when the worms are made of proper pitch, and, in such case, it will be obvious that their movement about their axes, in either direction, can be permitted and effected only in accordance with, and during, the rotation of the worms in the appropriate direction, through the pilot wheel, 25, and connected control shaft members, said wheel being turned to the right for forward motion adjustments, and to the left for backward motion adjustments. The direction of motion, and the degree of expansion or percentage of cut off, for which the reversing gear is adjusted, are indicated to the operator by an indicator, 29, which is shown in neutral or mid gear position in Figs. 9, 10, 11, 12 and 16. The indicator, 29, which projects from the rear of the casing, 24, and traverses over a dial, 30, fixed to the rear thereof, is formed on, or secured to, the periphery of a segmental gear, 31, which is mounted on, and adapted to swing about the axis of the shaft, 26, of the pilot wheel, 25. A master pinion, 32, formed on said shaft, engages a gear, 32ª, journaled on a stud, 32ᵇ, fixed in the casing, and a pinion, 32ᶜ, on the hub of the gear, 32ª, engages a segmental gear, 31, which carries the indicator, 29. Through the train of reduction gearing above described, the indicator is moved to the right by the rotation of the pilot wheel in that direction for forward motion adjustment, and to the left by the rotation of the pilot wheel for backward motion adjustment, and indicates on the dial, 30, the percentage of the stroke of the piston at which steam is cut off by the valve gear. When the indicator stands to the right of the zero or mid position, the reversing gear is adjusted and locked for forward motion, and when it stands to the left, the gear is adjusted and locked for backward motion, the percentage of cut off being, in either case, indicated.

The pilot wheel, 25, is locked in adjusted position by a locking lever, 33, which is journaled on a pin, 34, fixed to the casing, 24, and carries an arm, 33ª, which, in the middle or neutral position of the locking lever, shown in full lines in Fig. 10, is adapted to engage one of a plurality of notches, 25ᵇ, cut in a disk, 25ª, which is formed integral with the pilot wheel, 25. The locking lever also carries oppositely projecting arms, 33ᵇ, 33ᶜ, which are, respectively, adapted, when the lever is swung upon its pivot, to bear on, and unseat, fluid pressure governing valves, 35, 36, which are fitted in a casing, 37, and control communication between the fluid pressure reservoir, 38, and the conduits, 17, 17ª, which lead to opposite ends of the motor cylinders, 15, 15ª. In the middle or neutral position of the locking lever, the governing valves, 35, 36, are held seated by fluid pressure acting on their lower sides, and by springs, 39, which prevent the accidental unseating of the valves, and promptly return them to their closed positions, when, after they have been opened, the locking lever is returned to its middle position. When the locking lever is in said position, the conduits, 17, 17ª, are open to the atmosphere, through small exhaust ports, 40, (Fig. 15). These ports are made small so that some noise may be heard by the operator to indicate the proper moment of the pistons of the motor cylinders. Downward movement of the valves causes the upper exhaust ports to be covered and closed by the walls of the valve casing, 37, through which the valves project.

By making the worms of the forward and rear reverse shaft mechanisms of different pitch, or the lower arms of the forward and rear reverse shafts of different lengths respectively, the reversing gear may be adjusted to give a different percentage of cut off in the low pressure and high pressure engines respectively, at any position of the indicator on either side of its middle or neutral one, and in such case, the different percentages will be accurately indicated by the duplex dial, 30, shown in Fig. 16. The percentage numbers and scale are marked on the dial, in correspondence with the cut off adjustments of the high and low pressure engines.

In practice, the pilot wheel, its shaft, and the several sections and connections of the control shaft, are made of sufficient strength to enable the reversing gear, to be manually operated, in the event of breakage or derangement of the motor cylinder mechanism, and the shaft of the pilot wheel is preferably, as shown, connected to the adjoining control shaft member by a universal coupling, 28ᶜ.

While the specific form of gearing hereinbefore described, i. e., worm and wheel, is desirably applicable in the practice of my invention, such specific form is not an essential thereof, and gearing of other character, as for example, bevel gears, may be substituted in the discretion of the constructor without variation of, or departure from, the operative principle and spirit of my invention, as illustrated in Figs. 17 and 18. The locking of a reverse shaft, 4, is therein shown as effected by means of a bevel pinion, 21ᵃᵃ, journaled on a guide yoke, 7, and meshing with a corresponding segment gear, 14ᵃᵃ, fixed on the reverse shaft, the bevel pinion, 21ᵃᵃ, being rotated by a control shaft, 27ᵃᵃ, connected to the shaft of the bevel pinion by a universal coupling, 28ᵃᵃ. The operation of this locking gearing by the pilot wheel and its connections, is the same as that of the worm and worm gear mechanism before described.

To adjust the reversing gear for forward motion, the locking lever is moved forward to the position shown in dotted lines in Fig. 10, thereby releasing the pilot wheel and unseating the governing valve which controls the admission of motive fluid to the rear and the upper ends of the motor cylinders. The pilot wheel is then turned to the right, and the gears of the rear and forward reverse shafts thereby rotated, permitting the coincident movement of the segment gears and reverse shafts in direction to coincidently raise and lower, respectively, the radius bars of the valve gears, of the rear and the forward engines. This operation is continued until the reverse shafts have been brought to positions to cause the distribution valves to be operated to supply steam at full stroke or at any desired point of cut off, as shown by the position of the indicator. The reversing gear is then locked in this position by stopping the rotation of the pilot wheel and returning the locking lever to middle position, upon which the motive fluid will be exhausted from the motor cylinders by the seating of the governing valve, and movement of the reverse shafts will be prevented by the engagement of the gears with the reverse shaft segments.

The adjustment of the reversing gear for backward motion is correspondingly effected by the rearward movement of the locking lever and the rotation of the pilot wheel to the left, and the resultant release of the locking action of the gears and the admission of motive fluid to the opposite ends of the motor cylinders.

As will be apparent to those familiar with the construction and operation of locomotive engines, the forward extension of the control shaft, and the forward motor cylinder and operating mechanism, are not essentials of my invention, as the same are required only in articulated locomotives, or others having more than one set or pair of cylinders. It will also be understood that the reverse shafts extend to the opposite side of the locomotive, and are there connected with the valve gears of the cylinders on that side.

I claim as my invention and desire to secure by Letters Patent:

1. In a valve reversing gear, the combination of a reverse shaft, a motor coupled thereto, a gear fixed thereon, a manually operable gear meshing with the reverse shaft gear, and means for rotating said manually operable gear as a pilot for controlling the movements of the reverse shaft in adjustments of the reversing gear.

2. In a valve reversing gear, the combination of a reverse shaft, a motor coupled thereto, a gear fixed thereon, a manually operable gear meshing with the reverse shaft gear, and means for rotating said manually operable gear as a pilot for controlling the movements of the reverse shaft in adjustments of the reversing gear and for coincidently governing the operation of the motor.

3. In a valve reversing gear, the combination of a reverse shaft, a motor coupled thereto, a gear fixed thereon, a manually operable gear meshing with the reverse shaft gear, means for rotating said manually operable gear as a pilot for controlling the movements of the reverse shaft in adjustments of the reversing gear and for coincidently governing the operation of the motor, and means for locking said controlling and governing means.

4. In a valve reversing gear, the combination of a reverse shaft, a fluid pressure motor coupled thereto, a source of fluid pressure supply, a valve controlling the supply and exhaust of motive fluid from said source to and from the motor, a gear fixed on the reverse shaft, a manually operable gear meshing with the reverse shaft gear, and means for rotating said manually operable gear as a pilot for controlling the movements of the reverse shaft in adjustments of the reversing gear and for coincidently actuating the supply and exhaust valve of the motor.

5. In a valve reversing gear, the combination of a reverse shaft, a fluid pressure motor coupled thereto, a source of fluid pressure supply, a valve controlling the supply and exhaust of motive fluid from said source to and from the motor, a gear fixed on the reverse shaft, a manually operable gear meshing with the reverse shaft gear, means for rotating said manually operable gear as a pilot for controlling the movements of the reverse shaft in adjustments of the reversing gear and for coincidently actuating the supply and exhaust valve of the motor, and an indicator, operated by said rotating and actuating means, for indicating the desired adjusted position of the reverse shaft.

6. In a valve reversing gear, the combination of a reverse shaft, a motor coupled thereto, a worm wheel fixed thereon, a worm engaging said worm wheel, and manually operable means for rotating said worm as a pilot for controlling the movements of the reverse shaft in adjustments of the reversing gear.

7. In a valve reversing gear, the combination of a reverse shaft, a motor coupled thereto, a worm wheel fixed thereon, a worm engaging said worm wheel, and manually operable means for rotating said worm as a pilot for controlling the movements of the reverse shaft in adjustments of the reversing gear and for coincidently governing the operation of the motor.

8. In a valve reversing gear, the combination of a reverse shaft, a motor coupled thereto, a worm wheel fixed thereon, a worm engaging said worm wheel, manually operable means for rotating said worm as a pilot for controlling the movements of the reverse shaft in adjustments of the reversing gear and for coincidently governing the operation of the motor, and means for locking said controlling and governing means.

9. In a valve reversing gear, the combination of a reverse shaft, a fluid pressure motor coupled thereto, a source of fluid pressure supply, a valve controlling the supply and exhaust of motive fluid from said source to and from the motor, a worm wheel fixed on the reverse shaft, a worm engaging said worm wheel, and manually operable means for rotating said worm as a pilot for controlling the movements of the reverse shaft in adjustments of the reversing gear and for coincidently actuating the supply and exhaust valve of the motor.

10. In a valve reversing gear, the combination of a reverse shaft, a fluid pressure motor coupled thereto, a source of fluid pressure supply, a valve controlling the supply and exhaust of motive fluid from said source to and from the motor, a worm wheel fixed on the reverse shaft, a worm engaging said worm wheel, manually operable means for rotating said worm as a pilot for controlling the movements of the reverse shaft in adjustments of the reversing gear and for coincidently actuating the supply and exhaust valve of the motor, and an indicator, operated by said manually operable means, for indicating the desired adjusted position of the reverse shaft.

11. In a valve reversing gear, the combination of a plurality of reverse shafts, motors, each coupled to one of said shafts, gears, each fixed on one of said shafts, manually operable gears, each meshing with one of the reverse shaft gears, and means for coincidently rotating said manually operable gears as pilots for controlling the movements of the reverse shafts in adjustments of the reversing gear.

12. In a valve reversing gear, the combination of a plurality of reverse shafts, motors, each coupled to one of said shafts, gears, each fixed on one of said shafts, manually operable gears, each meshing with one of the reverse shaft gears, articulated shafts, coupling said manually operable gears, and means for rotating said manually operable gears as pilots for controlling the movements of the reverse shafts in adjustments of the reversing gear.

13. In a valve reversing gear, the combination of a reverse shaft, a motor coupled thereto, manually operable means for controlling the movements of the reverse shafts, an indicator actuated by said controlling means, and a dial over which said indicator traverses and which is marked with a plurality of designations corresponding with the adjustments of the reverse shaft.

14. In a valve reversing gear, the combination of a plurality of reverse shafts, power actuated means for operating said shafts, manually operable means for controlling the movements of the reverse shafts, an indicator actuated by said controlling means, and a dial over which said indicator traverses and which is marked with a plurality of designations corresponding with the adjustments of the several reverse shafts.

15. In a valve reversing gear, the combination of a reverse shaft, a worm wheel fixed thereon, a valve gear lifter arm fixed thereon, a worm shaft journaled in bearings transversely to the reverse shaft, a divided worm, fitted on the worm shaft with the capacity of relative longitudinal movement of its sections thereon and engaging the worm wheel, means for rotating the worm shaft, and means for effecting longitudinal adjustment of the sections of the worm on the worm shaft.

16. In a valve reversing gear, the combination of a reverse shaft, an arm and a segmental worm wheel fixed thereon, a worm engaging said worm wheel, means for controlling and locking said worm, a motor cylinder, a piston reciprocating therein and coupled to the reverse shaft arm, and means for effecting the supply and exhaust of motive fluid to and from said cylinder.

17. In a valve reversing gear, the combination of a reverse shaft, means for rotating said shaft, a manually operable controlling mechanism connected therewith and comprising a control shaft coupled to the rotating gear and a hand wheel connected to said control shaft, an indicator, and a reduction gear train actuated by the hand wheel and traversing the indicator in the same direction as said hand wheel.

WILLIAM DALTON.

Witnesses:
E. I. SCHAUBER,
WILL. W. HAMBLY.